UNITED STATES PATENT OFFICE 2,235,614

BREWER'S YEAST FOOD PRODUCT AND PROCESS FOR MAKING THE SAME

William P. M. Grelck, Baltimore, Md.

No Drawing. Application July 6, 1939,
Serial No. 283,010

2 Claims. (Cl. 99—2)

My invention relates to the art of processing fresh top or bottom brewer's yeast, or a mixture of the same, in the preparation of a self preserving food product of semi-solid consistency for edible purposes but particularly for animal nutrition.

This specification is a continuation in part of my specification filed December 8, 1938, under Serial No. 244,564.

One object of my invention is providing a method for producing a self preserving concentrate from fresh bottom or top brewer's yeast in a moist semi-solid form, containing hopbitterstuffs as a preservative. Hops are indispensable in the manufacture of beer, ale or the like; hops impart flavor, act as a coagulant and above all its function as a preservative is most important. Hops contain an average of 16% of bitterstuffs, soluble in wort, of which lupulon makes up approximately 6% and humulon 10%. The finished beer or ale retains approximately 20% of the original amounts of hopbitterstuffs added.

In the production of beer or ale 0.2% of hops by weight of wort is added and through the boiling process the lupulon and humulon, hereinafter designated as hopbitterstuffs, are thoroughly incorporated with the wort. Hops contain from 4% to 7% of lupulon and from 8% to 13% humulon, and impart to the wort its character of taste, cause coagulation of albuminous matter during the boiling process and, being strongly antiseptic, they act as a natural preservative in the fermented wort; the finished product, beer or ale, contains on an average of 0.07 milligram per 1000 grams of hopbitterstuffs.

Fresh brewer's yeast consists normally of 20% yeast solids and 80% fermented wort, it contains therefore 80% of 0.07 milligram of hopbitterstuffs as a preservative agent in 1000 grams of fresh brewer's yeast.

In my process I make use of the preservative qualities of hopbitterstuffs. I retain practically all of the qualities of fresh brewer's yeast including its juices. However, part of the juices of the heat treated fresh brewer's yeast in the form of fermented wort, after settling, may be drawn off to the extent of one fifth by volume, the remainder still retains a sufficient quantity of preservative hopbitterstuffs. From 100 lbs. of fresh brewer's yeast, according to my invention, from 55 lbs. to 60 lbs. of moisture is removed partly by a method of settling and partly by evaporation in vacuo or by evaporation in vacuo only. As proven by test, the vitamin content is preserved to a far greater extent by my process in producing a self preserving semi-solid yeast concentrate as compared with dried brewer's yeast.

My method eliminates the washing of the fresh brewer's yeast or other purifying methods, it is sieved to remove particles of hop resin or other solid particles that may have been carried over to the wort from the mash materials; I thus avoid losses in vitamin potency.

According to my invention, I use fresh brewer's bottom or top yeast or a mixture of the same, produced in the manufacture of beers, ales, porter and the like, as it is removed from the fermenters. Such fresh brewer's yeast contains from 20% to 25% total solids of which 16% to 20% consist of yeast solids and 4% to 5% solids of fermented wort including a uniform vitamin content due to the grain and malt material used.

Fresh top or bottom brewer's yeast or a mixture of the same, as removed from the fermenters, is heated by steam in a suitable apparatus to pasteurizing temperature of from 150 degrs. F. to 160 degrs. F. to kill the fermenting action of the yeast cell. The temperature may be increased to albumen coagulating temperature of from 172 degrs. F. to 180 degrs. F. and kept at this temperature for several minutes. Heating the fresh brewer's yeast to albumen coagulating temperature helps to disintegrate the yeast cell plasma, thereby breaks up the yeast cell and so releases the vitamin more readily when attacked by the digestive juices and further, the yeast settles more quickly when at rest in a storage tank so that part of the clear fermented wort may readily be drawn off, which increases the proportion of yeast solids, also economizes in steam consumption. The heated yeast is then drawn into a storage tank for the purpose of settling and is kept at rest for from 24 to 72 hours at room temperature, at the end of which time 20% by volume of clear supernatant fermented wort may be drawn off. However the settling procedure as described, may be eliminated and the pasteurized yeast or the yeast heated to albumen coagulating temperature may be drawn directly into a suitable evaporator fitted with steam jacket and agitator to keep the heating surface of the steam jacket clean, to remove the surplus moisture by evaporation in vacuo. Sufficient moisture is removed and its removal is so timed that the finished yeast concentrate contains from 40% to 50% solids including a self preserving quantity of hopbitterstuffs. Its consistency is in the form of a heavy paste.

The brewer's yeast concentrate, according to my process, is self preserving when packed in air-tight containers and may be transported to convenient locations for feeding purposes, or for impregnating feed stuffs with the same.

The following is a detailed explanation of performing this invention:

Example 1.— 80 lbs. of bottom fermented brewer's yeast and 20 lbs. of top fermented brewer's yeast are placed in a suitable container and heated with live steam to approximately 180 degrs. F. for the purpose of killing the fermenting action of the yeast cell and coagulating its albumen, as the first step of my process. After holding the yeast at albumen coagulating temperature for several minutes, it is sieved and drawn into a storage tank, cooled gradually to room temperature while kept at rest from 1 to 3 days. At the end of the resting period the yeast has settled, the supernatant clear fermented wort is drawn off, the remaining yeast, approximately 80% of its original volume, has its solids concentrated in proportion to the amount of supernatant wort drawn off, and ranges in the proportion of 25% yeast solids to 4% fermented wort solids, which is the second step of my process. The remaining settled brewer's yeast is now drawn into a vacuum evaporator fitted with steam jacket and agitator, sufficient moisture is evaporated in vacuo and is so timed that the finished moist yeast concentrate contains from 40% to 50% of total solids. The yeast concentrate so produced is in the form of a heavy paste when drawn off from the evaporator, it contains a self preserving quantity of hopbitterstuffs, then packed in air-tight containers, as the third step of my process.

Example 2.—100 lbs. of fresh brewer's top or bottom yeast as discharged from the fermenter is pasteurized in a suitable apparatus by heating the same to a temperature of 150 degrs. F. to 160 degrs. F. to kill the fermenting action of the yeast cell. The temperature may be increased to albumen coagulating temperature to from 172 degrs. F. to 180 degrs. F., it is then sieved to remove solid particles of hop resins or other substances that may have been brought into the wort from the mash tub or brewing kettle. Brewer's yeast may vary somewhat in total solids, it contains normally from 20% to 25% solids according to the method of brewing and the raw materials used. This concludes the first step of my process. The second step consists in drawing the pasteurized or superheated yeast into an evaporator fitted with steam jacket and agitator, to evaporate the surplus moisture in vacuo. The removal of moisture by evaporation in vacuo is so timed that the finished product contains from 40% to 50% of total solids of which approximately 4 parts by weight consist of yeast solids and 1 part by weight consist of fermented wort solids. The yeast concentrate so produced is in the form of a heavy paste when drawn off from the evaporator, and contains a self preserving quantity of hopbitterstuffs.

Since certain changes may be made in the above product and different embodiments of the invention could be made without departing from the scope thereof, it is intended that all matter contained in the above description shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. A method of producing a moist self preserving brewer's yeast food of semi-solid consistency from fresh bottom or top brewer's yeast, or a mixture of the same, as drawn from the fermenters and containing its normal amount of hopbitterstuffs, which comprises the killing of the fermenting action of the yeast cells by pasteurization, the increasing of the heat to albumen coagulating temperature for the purpose of coagulating the albumen of the yeast cell plasma, the settling of the so treated brewer's yeast in storage, then drawing off the supernatant wort, then drawing the so treated brewer's yeast fluid containing its normal amount of hopbitterstuffs into a vacuum evaporator fitted with stirring arrangement, for the purpose of removing surplus moisture, said removal of moisture is so timed that the finished yeast concentrate is of semi-solid consistency and contains approximately 44% solids including a self preserving quantity of hopbitterstuffs, it is then packed in air tight containers and ready to be used as a vitamin supplementary food.

2. A self preserving moist food product of semi-solid consistency from fresh bottom or top brewer's yeast, or a mixture of the same, containing the wet solids of brewer's yeast and the wet solids of fermented wort together with a self preserving quantity of hopbitterstuffs, the yeast solids make up approximately 4/5 of the total solids and the wort solids 1/5, the total solids comprise approximately 44%, the moisture content 56%.

WILLIAM P. M. GRELCK.